United States Patent [19]

Ogawa et al.

[11] Patent Number: 4,756,352

[45] Date of Patent: Jul. 12, 1988

[54] PNEUMATIC TIRE TREAD WITH DIVIDED SHOULDER

[75] Inventors: Hiroshi Ogawa; Kenichi Motomura, both of Higashiyamato; Yukimasa Yamada; Mamoru Mamada; Hikaru Tansei, all of Kodaira, all of Japan

[73] Assignee: Bridgestone Corporation 10-1

[21] Appl. No.: 847,269

[22] Filed: Apr. 2, 1986

[30] Foreign Application Priority Data

Apr. 3, 1985 [JP] Japan .................... 60-67477

[51] Int. Cl.$^4$ .............................................. B60C 11/03
[52] U.S. Cl. .............................................. 152/209 R
[58] Field of Search ............. 152/209 R, 209 D, 45 X

[56] References Cited

U.S. PATENT DOCUMENTS

| | | | |
|---|---|---|---|
| 3,949,797 | 4/1976 | Mirtain ........................... | 152/209 R |
| 3,976,115 | 8/1976 | Mirtain et al. ..................... | 152/209 |
| 4,262,722 | 4/1981 | Takigawa et al. ................... | 112/209 |
| 4,282,914 | 8/1981 | Takigawa et al. ................... | 152/209 R |
| 4,353,402 | 10/1982 | Bunche et al. ..................... | 152/209 R |

Primary Examiner—Michael Ball

[57] ABSTRACT

A pneumatic tire comprising a tread divided into at least three ribs by at least two main wide grooves extending substantially in a circumferential direction of the tire, wherein a shoulder rib arranged at an outermost end portion of the tread is divided in an axial direction parallel to an axis of rotation of the tire into at least two shoulder rib portions; and between two adjacent shoulder rib portions of said at least two shoulder rib portions, an outer surface of an outer shoulder rib portion is radially inwardly disposed with respect to an extension line of an outer surface of an inner shoulder rib portion arranged inwardly of the outer rib portion. A plurality of sipes may be formed in the vicinity of an outer end of at least one shoulder rib portion other than an outermost shoulder rib portion. Further, a plurality of sipes are formed in the vicinities of outer ends of at least two rib portions other than an outermost rib portion, the quantity of siping being gradually reduced in the axial direction.

26 Claims, 10 Drawing Sheets 4,756,352

PNEUMATIC TIRE TREAD WITH DIVIDED SHOULDER

FIELD OF THE INVENTION

The present invention relates in general to pneumatic tires operated at high speed on smooth surface roadways and in particular to an improvement in configuration of the tread of pneumatic radial tires which are employed in heavy-duty road vehicles such, for example, as trucks, buses and like vehicles, and which are operated at high speed on smooth surface roadways.

SUMMARY OF THE INVENTION

In accordance with one important aspect of the present invention, there is provided a pneumatic tire comprising a tread divided into at least three ribs by at least two main wide grooves extending substantially in a circumferential direction of the tire, wherein a shoulder rib arranged at an outermost end portion of the tread is divided in an axial direction parallel to an axis of rotation of the tire into at least two shoulder rib portions; and between two adjacent shoulder rib portions of said at least two shoulder rib portions, an outer surface of an outer shoulder rib portion is radially inwardly disposed with respect to an extension line of an outer surface of an inner shoulder rib portion arranged inwardly of the outer rib portion.

In accordance with another important aspect of the present invention, there is provided a pneumatic tire comprising a tread divided into at least three ribs by at least two main wide grooves extending substantially in a circumferential direction of the tire, wherein a shoulder rib arranged at an outermost end portion of the tread is divided in an axial direction parallel to an axis of rotation of the tire into at least two shoulder rib portions; between two adjacent shoulder rib portions of said at least two shoulder rib portions, an outer surface of an outer rib portion is radially inwardly inclined with respect to an outer surface of an inner shoulder rib portion arranged inwardly of the outer rib portion; and a plurality of sipes are formed in the vicinity of an outer end of at least one shoulder rib portion of said at least shoulder rib portions other than an outermost shoulder rib portion of said at least shoulder rib portions.

In accordance with still another important aspect of the present invention, there is provided a pneumatic tire comprising a tread divided into at least three ribs by at as two main wide grooves extending substantially in a circumferential direction of the tire, wherein a shoulder rib arranged at an outermost end portion of the tread is divided in an axial direction parallel to an axis of rotation of the tire into at least three shoulder rib portions; between two adjacent shoulder rib portions of said at least three shoulder rib portions, an outer surface of an outer rib portion is radially inwardly inclined with respect an outer surface of an inner shoulder rib portion arranged inwardly of the outer rib portion shoulder; and a plurality of sipes are formed in the vicinities of outer ends of at least two shoulder rib portions of said at least three shoulder rib portions; other than an outermost shoulder rib portion of said at least three shoulder rib portions the quantity of the siping being gradually reduced axially inwardly.

BRIEF DESCRIPTION OF THE DRAWINGS

The drawbacks of the tread of a prior art tire and the features and advantages of the tread of a pneumatic tire acccording to the present invention will be more clearly understood from a consideration of the following detailed description in conjunction with the annexed drawings in which.

DESCRIPTION OF THE PRIOR ART

So-called complete rib type, rib-lug type, and rib-block type are well known as a tread pattern or configuration for pneumatic tires chiefly operated at high speed on smooth surface roadways. The tread of such types is axially divided by two to five or more wide grooves extending substantially in the circumferential direction of the tire, and is formed with a plurality of circumferentially extending land portions (which will hereinafter be referred to as "ribs", including the land portions further divided in the circumferential direction by axially extending grooves). The word "axially" used in this specification is intended to mean a direction that is parallel to the axis of rotation of the tire.

However, the pneumatic tires of such tread patterns have some serious drawbacks. For example, there was the drawback that various uneven wears occur in each rib of the tread, particularly in the opposite shoulder ribs arranged at the axially outermost end portions of the tread.

Figure 10A:
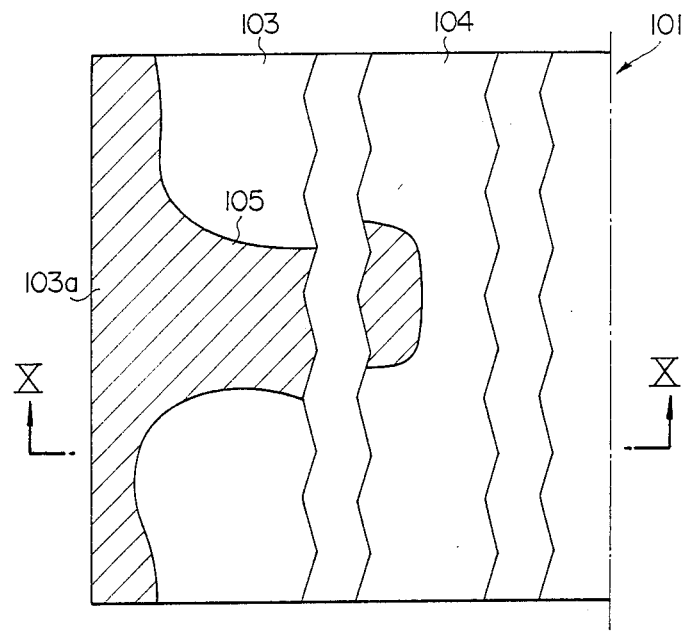
FIG. 10A is a part-plan view of the tread of the prior art tire.
Figure 10B:
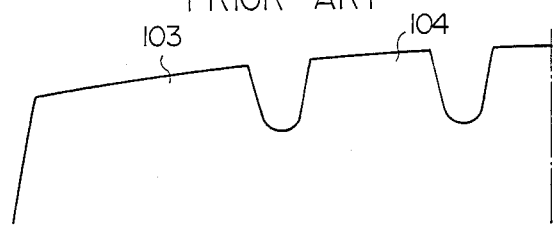
FIG. 10B is a cross sectional view of the tread substantially taken along line X—X indicated in FIG. 10A.

Although these uneven wears vary with the operating condition, operating period, etc., of the tire, the wear as shown in FIGS. 10A and 10B is a representative uneven wear. The wear occurred in the axially outermost end portion 103a of a shoulder rib 103 of a tread 101 unevenly extends axially inward of the tread 101. In a particular case, the local wear extends beyond the shoulder rib 103 and to a rib 104 arranged axially inwardly of the tread 101, and finally grows as indicated by oblique lines in FIG. 10A (this uneven wear is normally called an undulant wear because the outer surface of the shoulder rib undulates when the tire is viewed from the axial direction thereof).

Such uneven wear considerably impairs appearance of the tire, and causes the tire to vibrate, thereby resulting in deterioration in performance of the tire itself. Thus, the life of the tire is considerably decreased.

It is, accordingly, an important object of the present invention to provide an improved pneumatic tire which can overcome the uneven wear, thereby considerably improving the life of the tire.

DESCRIPTION OF THE PREFERRED EMBODIMENTS

Figure 1A:
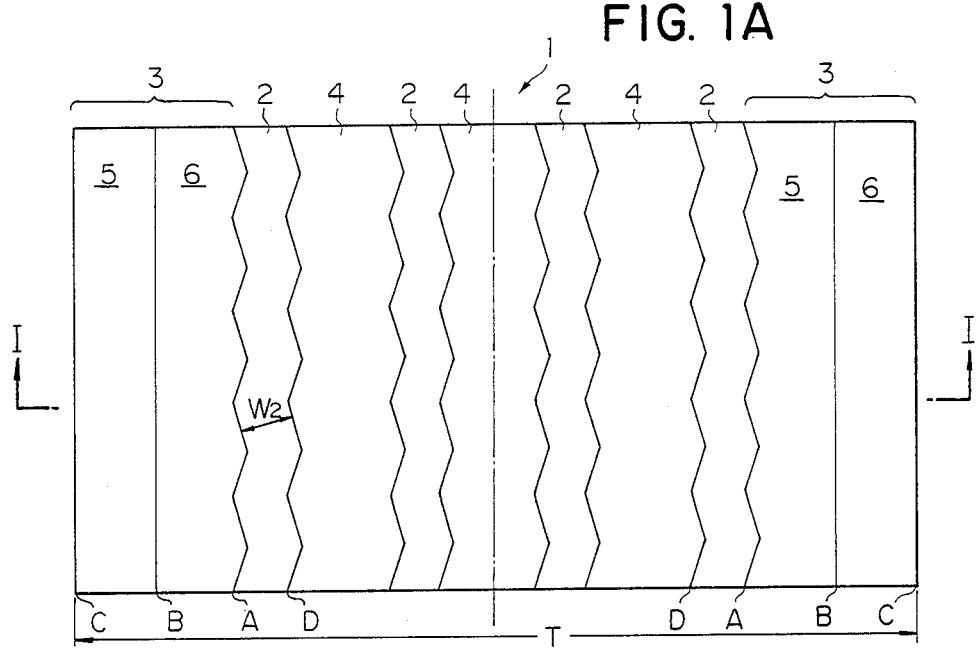
FIG. 1A is a part-plan view of the tread of a pneumatic radial tire constructed in accordance with a first embodiment of a first invention.

Referring initially to FIG. 1A of the annexed drawings, which is a part-plan view of the tread of a pneumatic radial tire constructed in accordance with a first embodiment of a first invention, the tread is generally designated by reference numeral 1. The pneumatic radial tire is well known which comprises a carcass ply containing cords arranged in parallel with the radial direction of the tire and a plurality of belts arranged at a crown portion of the tire and superimposed about the carcass ply, the belts having a high rigidity in the circumferential direction of the tire. Thus, the description of the internal construction will hereinafter be omitted.

The tread 1 according to the present invention is divided into at least three ribs by at least two main wide grooves extending substantially in the circumferential direction of the tire. The rib arranged at the axially outermost end portion of the tread is further axially divided into at least two rib portions. In the first embodiment, the tread 1 is divided into five ribs 3 and 4 by four main grooves 2 extending in zigzag fashion in the circumferential direction of the tire. The opposite shoulder ribs 3 and 3, which are arranged at the axially outermost end portions of the tread 1, are each axially divided into an outer rib portion 5 and an inner rib portion 6. Although it is most preferable that the boundary line between the outer and inner rib portions linearly extend in the circumferential direction of the tire, the boundary line may extend in zigzag fashion in the circumferential direction of the tire.

Figure 1B:
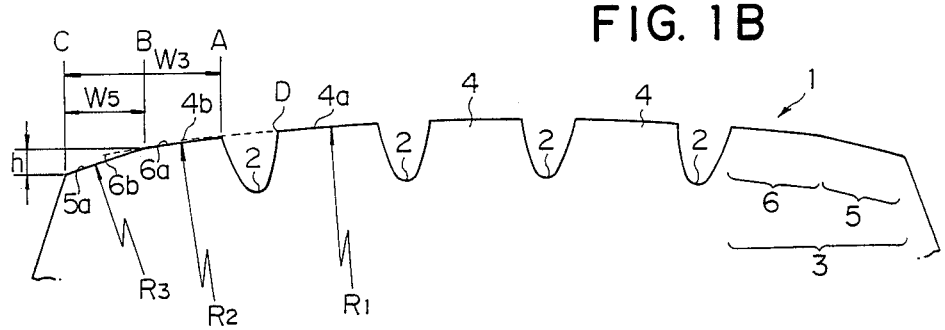
FIG. 1B is a cross sectional view of the tread substantially taken along line I—I indicated in FIG. 1A.

As shown in FIG. 1B, the outer surface 5a of the outer rib portion 5 extends radially inwardly from the common end B and terminates in the outermost end C of the shoulder rib 3, while the outer surface 6a of the inner rib portion 6 extends radially outwardly from the common end B and terminates in the innermost end A of the shoulder rib 3. More particularly, the outer surface 5a of the outer rib portion 5 is radially inwardly disposed with respect to the extension line 6b of the outer surface 6a of the inner rib portion 6. The extension line of the outer surface used herein is intended to mean an imaginary curve or line that extends at the same radius of curvature of the outer surface. The word "radially" is intended to mean a direction that is perpendicular to the axis of rotation of the tire. Thus, since the outer surface 5a of the outer rib portion 5 is lower than the extension line 6b of the outer surface 6a of the inner rib portion 6, local wear is effectively prevented from occurring in the vicinity of the outermost end of the shoulder rib 3 and from extending therefrom axially inwardly of the tread 1.

Each main groove 2 is constructed not so as to be closed in the region of the tread 1 contacted with the ground during cruising of the vehicle upon load, preferably the width $W_2$ thereof being from 4 to 8% of the tread width T of the tread 1. In FIG. 1B, the width $W_5$ of the outer rib portion 5 of the shoulder rib 3, viz., the width measured in the axial direction between the opposite ends B and C, is preferably from 2 to 15% of the tread width T, more preferably from 4 to 10%. The height h, measured in the radial direction of the tire, between the opposite ends B and C of the outer rib portion 5 of the shoulder rib 3, is preferably from 5 to 50% of the width $W_5$ of the outer rib portion 5, more preferably from 10 to 40%.

In addition, for the purpose of more effectively achieving the aforementioned effect, viz., the prevention of occurrence of the local wear, it is desirable that the outer surface 6a of the inner rib portion 6 of the shoulder rib 3 be also radially inwardly inclined with respect to the extension line 4b of the outer surface 4a of the rib 4 arranged axially inwardly of the shoulder rib 3 through the main rib 2. The reason is that since so-called ground-contact pressure of the shoulder rib 3 itself is further decreased suitably, the local wear is more effectively prevented from occurring in the vicinities of the outer ends of the outer and inner rib portions 5 and 6 and from extending therefrom axially inwardly of the tread 1. Accordingly, it is most preferable, from the standpoint of preventing the occurrence of the uneven wear in the shoulder rib, that as shown in FIG. 1B, the outer surface 4a of the rib 4 arranged axially inwardly of the shoulder rib 3 have a radius of curvature $R_1$ so that the extension line 4b thereof passes through the axially innermost end A of the shoulder rib 3, the outer surface 6a of the inner rib portion 6 extending between the ends A and B have a radius of curvature $R_2$ smaller than the radius of curvature $R_1$, and the outer surface 5a of the outer rib portion 5 extending between the ends B and C be a straight line, viz., the radius of curvature $R_3$ thereof being indefinite quantity.

Figure 2A:
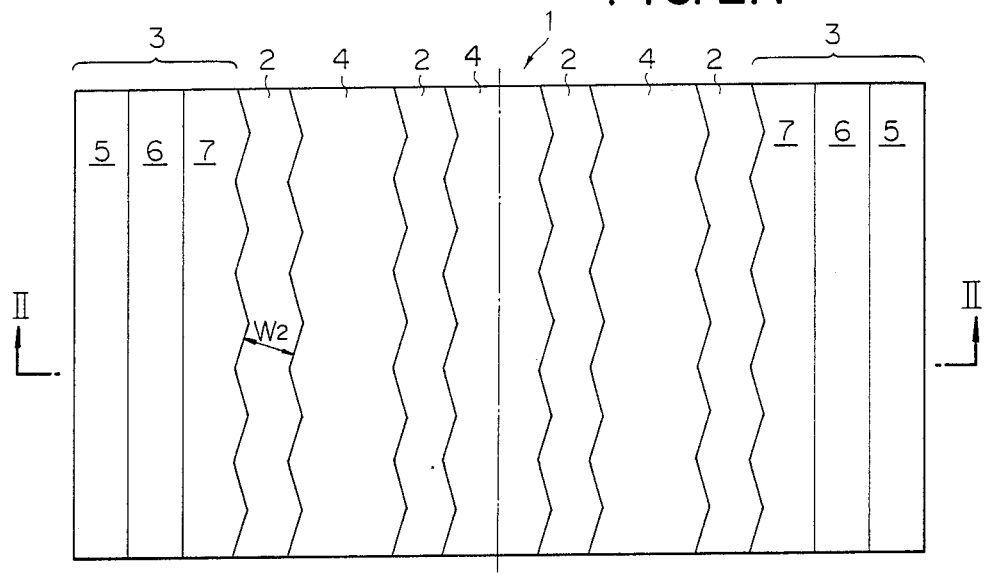
FIG. 2A is a part-plan view of the tread of a pneumatic radial tire constructed in accordance with a second embodiment of the first invention.
Figure 2B:
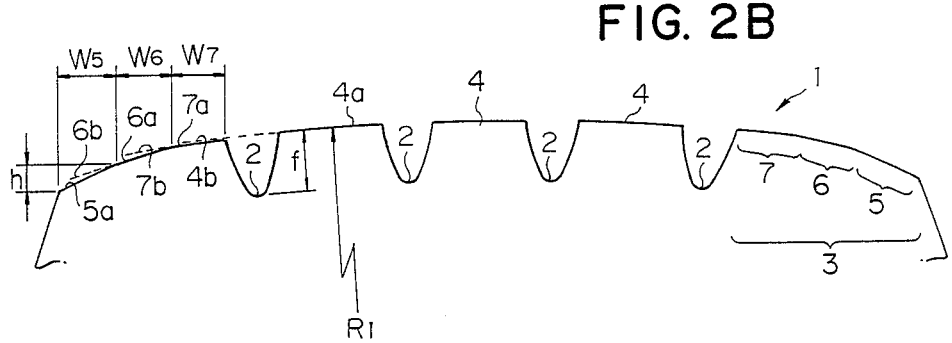
FIG. 2B is a cross sectional view of the tread substantially taken along line II—II indicated in FIG. 2A.

Referring to FIGS. 2A and 2B, there is shown a tread pattern of a pneumatic tire constructed in accordance with a second embodiment of the first invention. This second embodiment is characterized in that the rib 3 in the first embodiment as shown in FIGS. 1A and 1B is axially divided into an outermost rib portion 5, an intermediate rib portion 6 and an innermost rib portion 7. As described in the first embodiment, in order to prevent the occurrence of the local wear, the outer surface 6a of the intermediate rib portion 6 is radially inwardly inclined with respect to the extension line 7b of the outer surface 7a the innermost rib portion 7. Likewise, the outer surface 5a of the outermost rib portion 5 is radially inwardly inclined with respect to the extension line 6b of the outer surface 6a of the intermediate rib portion 6. As described the first embodiment, it is more preferable that the surface 7a of the innermost rib portion 7 is radially inclined with respect to the extension line 4b of the outer surface 4a of the rib 4 arranged axially inwardly of the rib 3 through the main groove 2. The portions the tread substantially identical in construction and operation to those of the first embodiment of the first invention are designated by like reference numerals and therefore the description thereof will hereinafter be omitted.

Figure 3A:
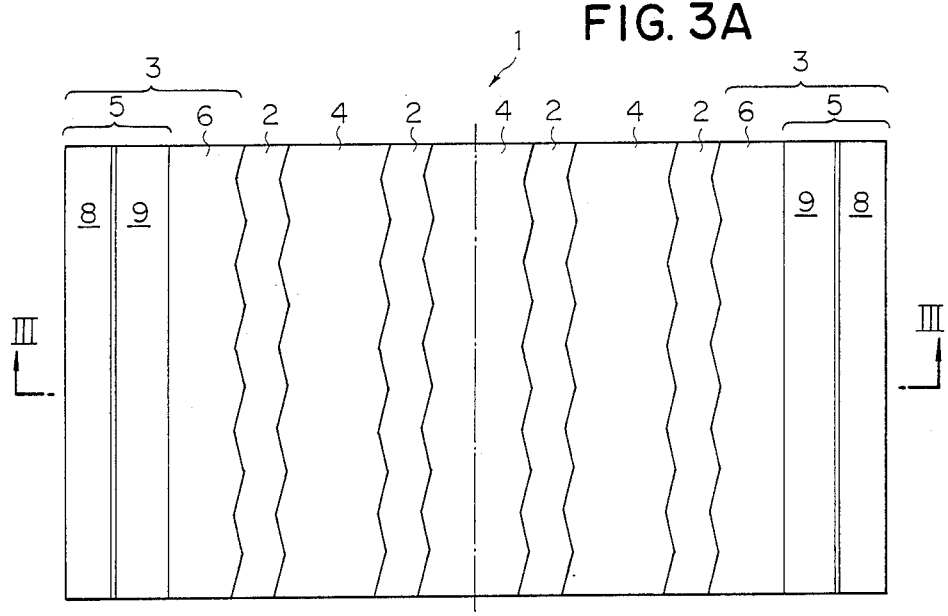
FIG. 3A is a part-plan view of the tread of a pneumatic radial tire constructed in accordance with a third embodiment of the first invention.
Figure 3B:
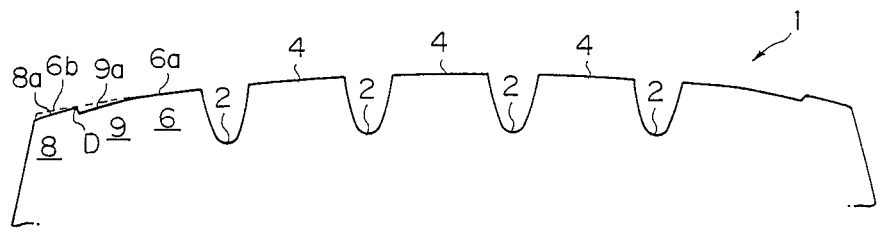
FIG. 3B is a cross sectional view of the tread substantially taken along line III—III indicated in FIG. 3A.
Figure 4A:
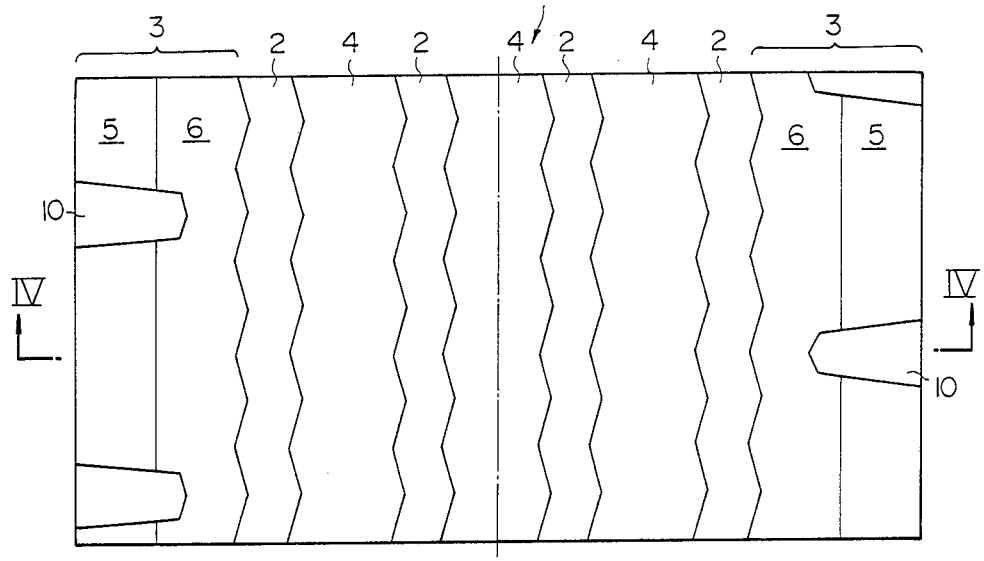
FIG. 4A is a part-plan view of the tread of a pneumatic radial tire constructed in accordance with a fourth embodiment of the first invention.
Figure 4B:
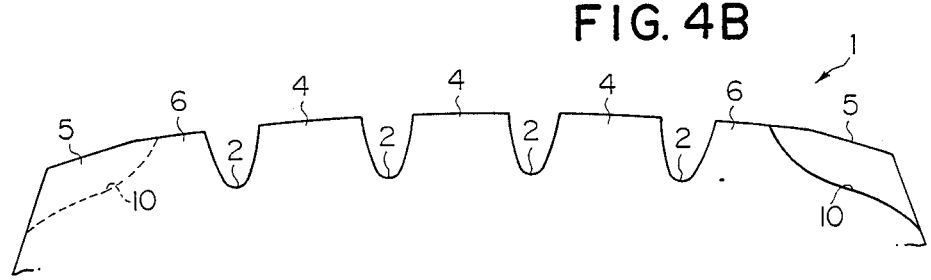
FIG. 4B is a cross sectional view of the tread substantially taken along line IV—IV indicated in FIG. 4A.
Figure 5A:
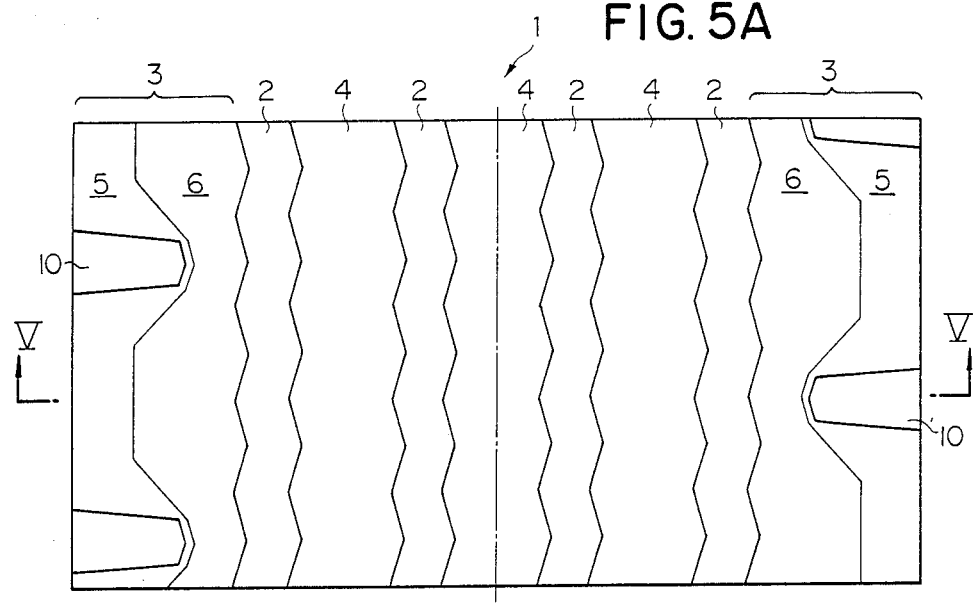
FIG. 5A is a part-plan view of the tread of a pneumatic radial tire constructed in accordance with a fifth embodiment of the first invention.
Figure 5B:
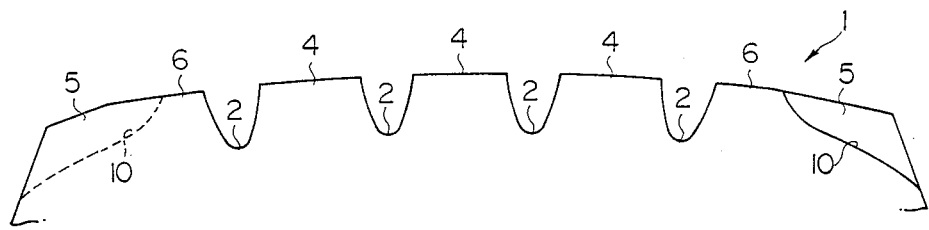
FIG. 5B is a cross sectional view of the tread substantially taken along line V—V indicated in FIG. 5A.

Referring to FIGS. 3A and 3B, there is shown a tread pattern of a pneumatic tire constructed in accordance with a third embodiment of the first invention. This third embodiment is characterized in that the shoulder rib 3 in the first embodiment as shown FIGS. 1A and 1B is axially divided into an outer rib portion 5 and an inner rib portion 6, and further the outer rib portion 5 is axially divided into a small outer rib portion 8 and a small inner rib portion 9. The third embodiment is substantially identical in construction and operation to the first embodiment, except that the outer end portion of the outer surface 9a of the small inner rib portion 9 is raised so that the inner end D of the outer surface 8a of the small outer rib portion 8 is located on the extension line 6b of the outer surface 6a of the inner rib portion 6. Thus, the description of the portions of the tread substantially identical to those of the first embodiment will hereinafter be omitted by designating like reference numerals.

FIGS. 4A, 4B and 5A, 5B illustrate tread patterns of pneumatic tires constructed in accordance with fourth and fifth embodiments of the first invention, respectively. In these fourth and fifth embodiments, a plurality of axially extending lug grooves 10 are formed in the shoulder rib 3 in the first embodiment as shown in FIGS. 1A and 1B. The groove 10 in the fourth embodiment of FIGS. 4A and 4B extends from the outer end of the outer rib portion 5 beyond the inner end of the outer rib portion 5 and into the inner rib portion 6, while the groove 10 in the fifth embodiment of FIGS. 5A and 5B extends from the outer end of the outer rib portion 5 and terminates short of the inner rib portion 6. The fourth and fifth embodiments are substantially identical in construction and operation to the first embodiment except for the provision of the axially extending lug grooves 10 in the shoulder rib, and therefore the description will hereinafter be omitted by designating like reference numerals.

Figure 6A:
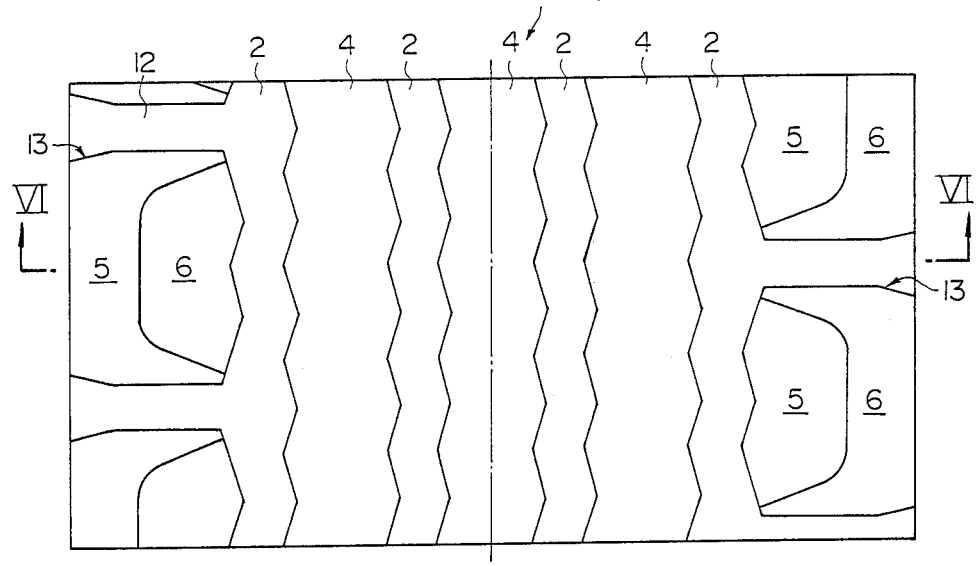
FIG. 6A is a part-plan view of the tread of a pneumatic radial tire constructed in accordance with a sixth embodiment of the first invention.
Figure 6B:
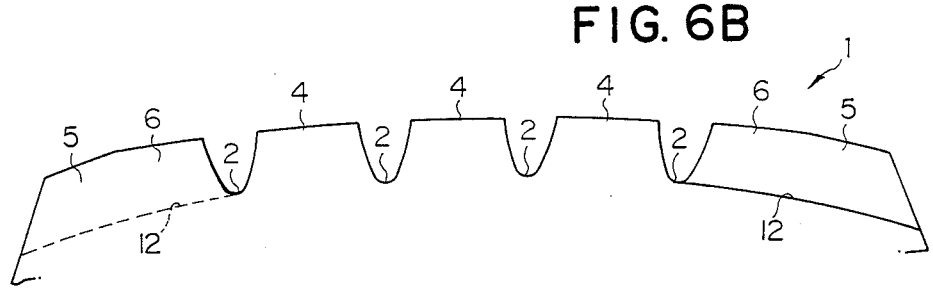
FIG. 6B is a cross sectional view of the tread substantially taken along line VI—VI indicated in FIG. 6A.

FIGS. 6A and 6B show a tread pattern of a pneumatic tire constructed in accordance with a sixth embodiment of the first invention. In this sixth embodiment, the opposite outer end portions of the tread 1 are each formed with a plurality of blocks 13 in stead of the shoulder rib 3 in the first embodiment. Between the adjacent blocks 13 is arranged a groove 12 which axially extend from the outermost end of the tread 1 and terminates in the main groove 2 as shown. Thus, the opposite outer end portions of the tread 1 are each circumferentially divided into the blocks 13 by the axially extending grooves 12. Each block 13 comprises outer and inner rib portions 5 and 6 which are substantially identical in construction and operation to those of the first embodiment. The six embodiment is substantially identical in construction and operation to the first embodiment except that the shoulder ribs 3 and 3 are replaced with the blocks 13, and therefore the portions of the tread corresponding to those of the first embodiment are designated by like reference numerals for avoiding the description thereof.

Figure 7A:
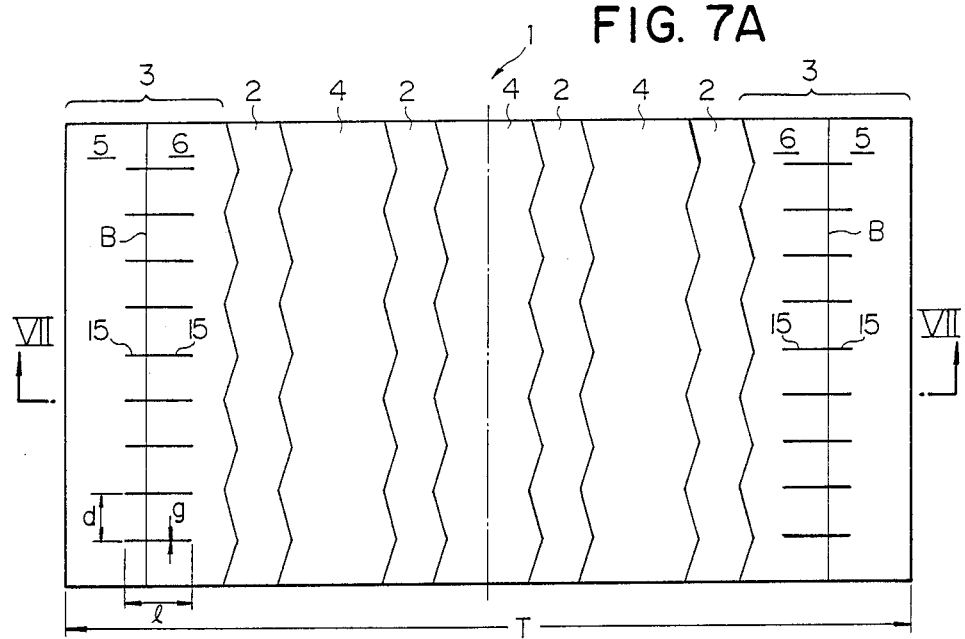
FIG. 7A is a part-plan view of the tread of a pneumatic radial tire constructed in accordance with a first embodiment of a second invention.
Figure 7B:
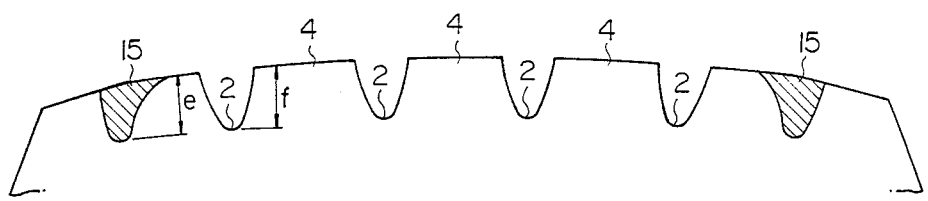
FIG. 7B is a cross sectional view of the tread substantially taken along line VII—VII indicated in FIG. 7A.

Referring to FIGS. 7A and 7B, there is shown a tread pattern of a pneumatic tire constructed in accordance with a first embodiment of a second invention. The portions of the tread substantially identical in construction and operation to those of the first invention hereinbefore described are designated by like reference numerals for avoiding the description thereof, and the only necessary part will hereinafter be described.

The shoulder ribs 3 and 3 arranged at the opposite outermost end portions of the tread 1 are each axially divided into at least two rib portions. In this first embodiment of the second invention, the shoulder rib 3 comprises outer and inner rib portions 5 and 6. In the vicinity of an outer end of at least one of inner rib portions other than the outermost rib portion are provided a plurality of sipes or incisions 15 so that the rigidity of outer end portion of inner rib portion 6 is decreased, for the purpose of effectively preventing the local wear occurred in the outer rib portion 5 from extending to the inner rib portion 6. As shown in FIGS. 7A and 7B, each sipe 15 is formed in the vicinity of the outer end B of the inner rib portion 6 of the shoulder rib 3. The sipes 15 are circumferentially spaced apart a small space d from one another and substantially axially extend and are substantially vertically incised with respect to the outer surface of the tread 1, as shown in FIG. 7B. In this instance, more than a certain number or quantity of sipes 15 must be provided to reduce the rigidity of the shoulder rib 3 to the degree of obtaining the effect of the present invention. The axial length l, measured on the tread surface, of the sipe 15 is desired to be not less than 2% of the tread width T, more preferably from 3 to 10%. The sipe 15 may also extend across the inner rib portion 6. The depth e of the sipe 15 is preferable to be from 30 to 100% of the depth f of the outermost main groove 2, more preferably from 50 to 100%. The space d, measured in the circumferential direction of the tire, of the sipe 15 is preferable to be from 2 to 10% of the tread width T, more preferably from 3 to 7%. The width g of the sipe 15 is a width necessary for being substantially closed in the region of the tread contacted with the ground during cruising of the vehicle upon load, preferably from 0.3 to 1.5 mm.

Figure 8A:
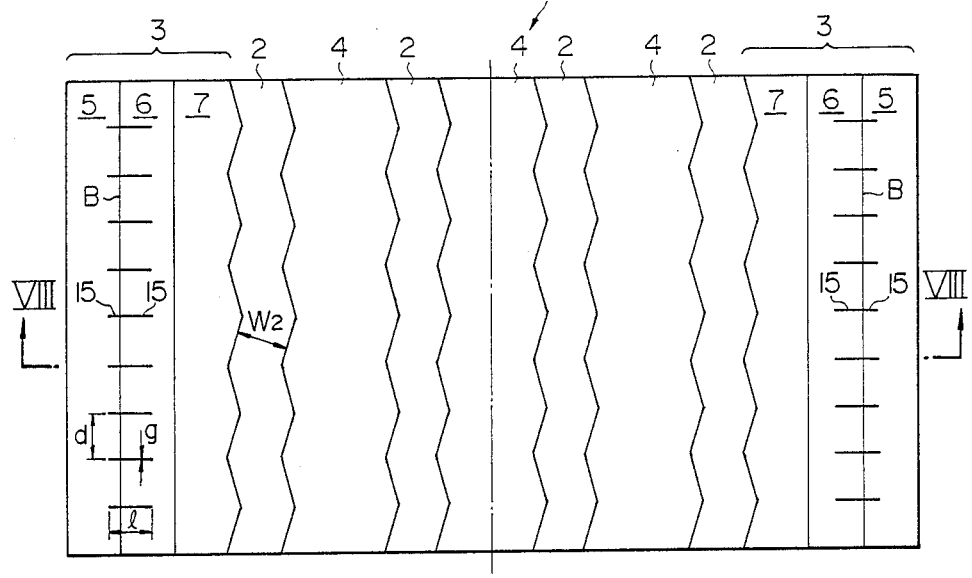
FIG. 8A is a part-plan view of the tread of a pneumatic radial tire constructed in accordance with a second embodiment of the second invention.
Figure 8B:
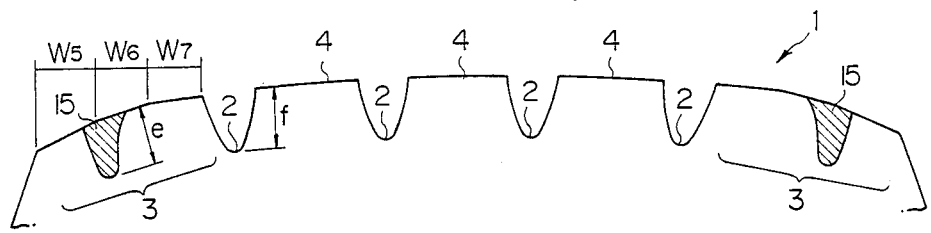
FIG. 8B is a cross sectional view of the tread substantially taken along line VIII—VIII indicated in FIG. 8A.

Referring to FIGS. 8A and 8B, there is shown a tread pattern of a pneumatic tire constructed in accordance with a second embodiment of the second invention. FIG. 8A is a part-plan view of the tread and FIG. 8B is a cross sectional view of the tread substantially taken along line VIII—VIII indicated in FIG. 8A. The portions of the tread substantially identical in construction and operation to those of the first invention hereinbefore described are designated by like reference numerals for avoiding the description thereof, and the only necessary part will hereinafter be described.

The shoulder ribs 3 and 3 arranged at the opposite outermost end portions of the tread 1 are each axially divided into an outermost rib portion 5, an intermediate rib portion 6 and an innermost rib portion 7. In the vicinity of the outer end B of the intermediate rib portion 6 are provided a plurality of sipes or incisions 15 so that the rigidity of outer end portion of intermediate rib portion 6 is decreased, for the purpose of effectively preventing the local wear occurred in the outer rib portion 5 from extending to the intermediate and innermost rib portions 6 and 7. The sipes 15 of the second embodiment of the second invention are substantially identical in arrangement, length l, depth e, space d and width g to those of the first embodiment of the second invention and therefore the description thereof will hereinafter be omitted by designating like reference numerals.

Figure 9A:
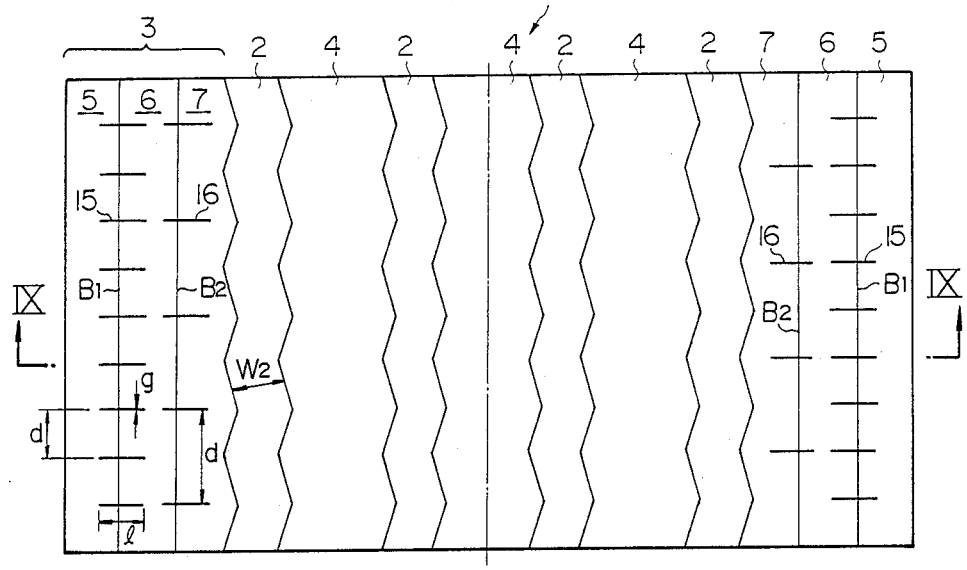
FIG. 9A is a part-plan view of the tread of a pneumatic radial tire constructed in accordance with one embodiment of a third invention.
Figure 9B:
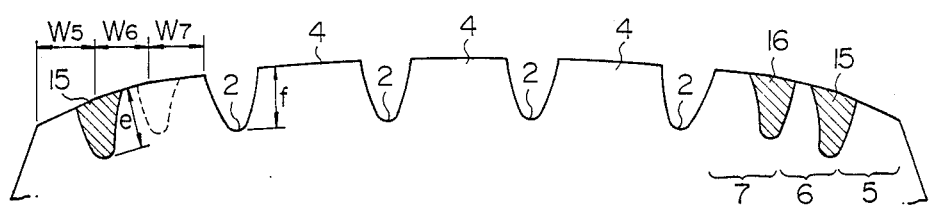
FIG. 9B is a cross sectional view of the tread substantially taken along line IX—IX indicated in FIG. 9A.

Referring to FIGS. 9A and 9B, there is shown a tread pattern of a pneumatic tire constructed in accordance with one embodiment of a third invention. FIG. 9A is a part-plan view of the tread and FIG. 9B is a cross sectional view of the tread substantially taken along line IX—IX indicated in FIG. 9A. The portions of the tread substantially identical in construction and operation to those of the first and second inventions hereinbefore described are designated by like reference numerals for avoiding the description thereof, and the only necessary part will hereinafter be described.

In this embodiment of the third invention, the shoulder ribs 3 and 3 arranged at the outermost end portions of the tread 1, as shown in the second embodiment of the first invention, are axially divided into an outermost rib portion 5, an intermediate rib portion 6 and an innermost rib portion 7. In the vicinities of the outer ends $B_1$ and $B_2$ of the intermediate and innermost rib portions 6 and 7 are respectively provided a first set of sipes or incisions 15 and a second set of sipes or incisions 16 so that the rigidities of the outer end portions of the intermediate and innermost rib portions 6 and 7 are decreased, for the purpose of effectively preventing the local wear occurred in the outermost rib portion 5 from extending to the intermediate and innermost rib portions 6 and 7. The quantity of the sipes, that is the total of projected areas of the sipes on the radial plane per unit length in the circumferential direction of the tire, is gradually reduced axially inwardly. More particularly, the quantity of the sipes 16 arranged in the vicinity of the outer end $B_2$ of the innermost rib portion 7 arranged axially inwardly of the intermediate rib portion 6 is smaller that that of the sipes 15 arranged in the vicinity of the outer end $B_1$ of the intermediate rib portion 6. The reason is that the lateral force, which causes the uneven wear, is larger in the outside than in the inside.

The first set of the sipes 15 in the third invention is substantially identical to those of the second embodiment of the second invention, and the third invention is substantially identical to the second embodiment of the second invention except that a second set of sipes 16, in addition to the first set of sipes 15, is formed in the vicinity of the outer end $B_2$ of the inner rib portion 7. Therefore, the only necessary part will hereinafter be described by designating like reference numerals.

In the embodiment of the third invention, the total of the projected areas of the sipes 15, arranged in the vicinity of the outer end $B_2$ of the intermediate rib portion 6, on the radial plane, is from 50 to 500 mm$^2$ per unit length (which will hereinafter be 1 cm) in the circumferential direction of the tire, preferably from 100 to 300 mm$^2$. The ratio between totals of projected areas of the sipes on the radial planes between the rib portions 6 and 7 per unit length in the circumferential direction, that is, the ratio between the total of the projected areas of the sipes 15 and the total of the projected areas of the sipes 16 is from 0.2 to 0.8, preferably from 0.3 to 0.7.

In order that the quantity of the sipes arranged axially inwardly of the tread is smaller than that of the sipes arranged axially outwardly, the length l, depth e and circumferential space d of the sipe can be varied. That is, the sipes may vary in length l, depth e or circumferential space d in such a manner that the quantity of siping is gradually reduced in the axial direction.

It should be noted that in the present invention the sipes may be provided in the vicinity of the shoulder end of the tread. The shoulder end may also be of so-called square shoulder type, round shoulder type and taper shoulder type. The tread width T is a width, measured axially of the tire, of the region of the tread contacted with the ground when the tire is operated under standard load of the tire. In the case of the tire with a so-called round shoulder, the tread width T is measured between opposite intersection points at which the extension lines of the outer surface of the tread and the extension lines of the opposite side walls of the tire intersect each other. In some cases, circumferentially extending narrow grooves or axially extending grooves may be formed within the shoulder rib. The present invention may also be applicable only to either half portion of the opposite portions of the tread divided by the mid-circumferential line of the tire.

The operation of the tread constructed as hereinbefore described will be described.

Local wear is caused to occur in the outer end portion of the shoulder rib by lateral force produced during turning of the vehicle and by drag produced during straight drive of the vehicle due to the difference in radius between the tread central portion and lateral edge portions of the tire. The local wear then extends from the outer end portion of the shoulder rib in the circumferential, in the axial inward direction and in the depth directions, and finally grows to various uneven wears.

According to the first invention, the aforementioned local wear is effectively prevented from occurring in the shoulder rib and from axially inwardly extending therefrom, and wear on the tread is evenly distributed, by axially dividing the tread into at least two different rib portions. That is, the outer surface of the outer rib portion is radially inwardly inclined with respect to the outer surface of the inner rib portion arranged inwardly of the outer rib portion, between two adjacent rib portions. For this reason, when the lateral force is exerted upon the tread, the ground-contact pressure acting on the outer rib portion, particularly on the shoulder rib end is properly reduced and evenly distributed over the shoulder rib. As a consequence, the local wear is effectively prevented from occurring in the shoulder rib and from axially inwardly extending therefrom, and wear on the tread is evenly distributed.

According to the second invention, a plurality of sipes, in addition to the particular feature of the first invention, are provided in the vicinity of the outer end of at least one rib portion other than an outermost rib portion. For this reason, since the rigidity of the outer end portion of the shoulder rib is decreased, the local wear is more effectively prevented from extending in the circumferential and axial inward directions. Further, new local wear is prevented from occurring in the outer end portion of the inner rib portion.

According to the third invention, a plurality of sipes, in addition to the particular feature of the first invention, are provided in the vicinities of outer ends of at least two rib portions other than an outermost rib portion, the quantity of the siping being gradually reduced in said axial direction. This is because that the lateral force, which causes the uneven wear, is larger in the outer end portion of the tread. Thus, the uneven wear is still more effectively prevented from extending axially inwardly of the shoulder rib.

The effect of the present invention will hereinafter be described in conjunction with tires of the following three kinds according to the present invention and a prior art tire.

All the tire sizes are a pneumatic radial tire of 10.00R20 14PR (internal pressure, 7.25 kg/cm$^2$) and the internal construction is substantially identical to that of a known pneumatic radial tire. The tested tires of the three kinds are a pneumatic radial tire Q of the first invention having a tread pattern as shown in FIGS. 2A and 2B, a pneumatic radial tire R of the second invention having a tread pattern as shown in FIGS. 8A and 8B, and a pneumatic radial tire S of the third invention having a tread pattern as shown in FIGS. 9A and 9B. The four main grooves 2 and the shoulder rib 3 comprising three rib portions 5, 6 and 7 axially arranged are common to all. The dimensions of the treads of the tires Q, R and S are shown in Table 1. On the other hand, the prior art tire P is a tire as shown in FIGS. 10A and 10B, the tread pattern of which has no particular features residing in the present invention.

and the maximum depth of the local wear of the prior art tire P are indicated as 100 by an index number, and the smaller value indicates the better performance of the tire.

It will be seen from the test results shown in Table 2 that the tires Q, R and S constructed in accordance with the present invention are considerably reduced in number of the local wears and in maximum depth of the local wear. Thus, the occurrence and growth of the local wear are effectively prevented.

From the foregoing results, it will be seen that an improved pneumatic tire which can overcome the uneven wear on the shoulder rib and which considerably improves the life of the tire is afforded by the present design. While certain representative embodiments and details have been shown for the purpose of illustrating the subject matter of the present invention, it will be apparent to those skilled in this art that various changes and modification may be made therein without departing from the spirit or scope of the invention.

TABLE 2

|  | Prior art tire P | Tire Q according to the first invention | Tire R according to the second invention | Tire S according to the third invention |
|---|---|---|---|---|
| The number of local wears, on the shoulder rib 3 and on the shoulder rib 103, which reached to the outermost main groove 2 | 100 | 20 | 13 | 13 |
| The maximum depth of the local wear | 100 | 32 | 25 | 20 |

TABLE 1

|  | Prior art tire P | Tire Q according to the first invention | Tire R according to the second invention | Tire S according to the third invention |
|---|---|---|---|---|
| Tread width T | 185 | 185 | 185 | 185 |
| Main groove 2 |  |  |  |  |
| width W$_2$ | 11 | 11 | 11 | 11 |
| depth f | 13 | 13 | 13 | 13 |
| Width W$_3$ of shoulder rib | 35 | 35 | 35 | 35 |
| Width W$_5$ of rib portion 5 | — | 11 | 11 | 11 |
| Width W$_6$ of rib portion 6 | — | 11 | 11 | 11 |
| Width W$_7$ of rib portion 7 | — | 13 | 13 | 13 |
| First set of sipes 15 |  |  |  |  |
| length l | — | — | 10 | 10 |
| depth e | — | — | 13 | 13 |
| space d | — | — | 9 | 9 |
| width g | — | — | 0.5 | 0.5 |
| Second set of sipes 16 |  |  |  |  |
| length l | — | — | — | 10 |
| depth e | — | — | — | 10 |
| space d | — | — | — | 18 |
| width g | — | — | — | 0.5 |

(Unit; mm)

The tires of three kinds are employed in front wheels of the vehicle and are tested under condition of smooth surface roadway of 100%, average velocity of 60 km/hr, and standard load of JIS (Japanese Industrial Standard). The number of local wears, on the shoulder rib 3 according to the present invention and on the shoulder rib 103 of the prior art, which reached to the outermost main groove 2, is measured at a travelling distance of 50,000 km, and the maximum depth of the local wear is also measured. These test results are shown in Table 2 wherein the number of local wears

What is claimed is:

1. A pneumatic tire comprising a tread divided into at least three ribs by at least two main wide grooves extending substantially in a circumferential direction of said tire, wherein
a shoulder rib arranged between an outermost main wide groove and a shoulder edge of said tread is divided in an axial direction parallel to axis of rotation of said tire into at least two shoulder rib portions; and between two adjacent shoulder rib portions of said least two shoulder rib portions, an outer surface of an outer shoulder rib portion is radially inwardly inclined with respect to an extension of line of an outer surface of an inner shoulder rib portion arranged axially inwardly of said outer shoulder rib portion, said outer rib portion joining the said inner rib portion in a continuous and stepless manner, whereby uneven wear of said tread is minimized.

2. A pneumatic tire as set forth in claim 1, in which an outermost rib portion has a width, measured in said axial direction, which is from 2 to 15% of a width of said tread.

3. A pneumatic tire as set forth in claim 1, in which an outermost rib portion has a height, measured in a radial direction of said tire between outer and inner ends of said outermost rib portion, which is from 5 to 50% of a width, measured in said axial direction, of said outermost rib portion.

4. A pneumatic tire as set forth in claim 1, in which an innermost rib portion has an outer surface which is radially inwardly inclined with respect to an outer surface of the rib arranged inwardly of said shoulder rib through said main groove.

5. A pneumatic tire as set forth in claim 1, in which said shoulder rib is divided in said axial direction into at least three rib portions.

6. A pneumatic tire comprising a tread divided into at least three ribs by at least two main wide grooves extending substantially in a circumferential direction of said tire, wherein
a shoulder rib arranged between an outermost main wide groove and a shoulder edge of said tread is divided in an axial direction parallel to an axis of rotation of said tire into at least two shoulder rib portions;
between two adjacent shoulder rib portions of said at least two shoulder rib portions, an outer surface of an outer shoulder rib portion is radially inwardly inclined with respect to an outer surface of an inner shoulder rib portion arranged axially inwardly of said outer shoulder rib portion, said outer rib portion joining with said inner rib portion in a continuous and stepless manner; and
a plurality of sipes are formed in the vicinity of an outer end of at least one shoulder rib portion of said at least two shoulder rib portions other than an outermost shoulder rib portion of said at least two shoulder rib portions, whereby uneven wear of said tread is minimized.

7. A pneumatic tire as set forth in claim 6, in which said outermost rib portion has a width, measured in said axial direction, which is from 2 to 15% of a width of said tread.

8. A pneumatic tire as set forth in claim 6, in which said outermost rib portion has a height, measured in a radial direction of said tire between outer and inner ends of said outermost rib portion, which is from 5 to 50% of a width, measured in said axial direction, of said outermost rib portion.

9. A pneumatic tire as set forth in claim 6, in which an innermost rib portion has an outer surface which is radially inwardly inclined with respect to an outer surface of the rib arranged inwardly of said shoulder rib through said main groove.

10. A pneumatic tire as set forth in claim 6, in which said shoulder rib is divided in said axial direction into at least three rib portions.

11. A pneumatic tire as set forth in claim 6, in which said sipes are at least formed in the vicinity of an outer end of the rib portion arranged inwardly of said outermost rib portion.

12. A pneumatic tire as set forth in claim 6, in which said sipes are circumferentially spaced apart predetermined space from one another and substantially extend axially 13. A pneumatic tire as set forth in claim 6, in which each sipe has a length, measured in said axial direction, which is not less than 2% of a width of said tread.

14. A pneumatic tire as set forth in claim 6, in which each sipe has a depth which is from 30 to 100% of a depth of the main groove arranged inwardly of said shoulder rib.

15. A pneumatic tire as set forth in claim 12, in which said predetermined space is from 2 to 10% of a width of said tread.

16. A pneumatic tire comprising a tread divided into at least three ribs by at least two main wide grooves extending substantially in a circumferential direction of said tire, wherein
a shoulder rib arranged between an outermost main wide groove and a shoulder edge of said tread is divided in an axial direction parallel to axis of rotation of said tire into at least three shoulder rib portions;
between two adjacent shoulder rib portions of said at least three shoulder rib portions, an outer surface of an outer shoulder rib portion is radially inwardly inclined with respect to an outer surface of an inner shoulder rib portion arranged axially inwardly of said outer shoulder rib portion, said outer rib portion joining with said inner rib portion in a continuous and stepless manner; and
a plurality of sipes are formed in the vicinities of outer ends of at least two shoulder rib portions of said at least three shoulder rib portions other than an outermost shoulder rib portion of said at least three shoulder rib portions, the quantity of siping being gradually reduced axially inwardly, whereby uneven wear of said tread is minimized.

17. A pneumatic tire as set forth in claim 16, in which said outermost rib portion has a width, measured in said axial direction, which is from 2 to 15% of a width of said tread.

18. A pneumatic tire as set forth in claim 16, in which said outermost rib portion has a height, measured in a radial direction of said tire between outer and inner ends of said outermost rib portion, which is from 5 to 50% of a width, measured in said axial direction, of said outermost rib portion.

19. A pneumatic tire as set forth in claim 16, in which an innermost rib portion has an outer surface which is radially inwardly inclined with respect to an outer surface of the rib arranged inwardly of said shoulder rib through said main groove.

20. A pneumatic tire as set forth in claim 16, in which a ratio between totals of projected areas of said sipes on the radial planes per unit length in said circumferential direction between two adjacent rib portions, is from 0.2 to 0.8.

21. A pneumatic tire as set forth in claim 16, in which said sipes vary in length in such a manner that the quantity of siping is gradually reduced in said axial direction.

22. A pneumatic tire as set forth in claim 20, in which said sipes vary in length in such a manner that the quantity of siping is gradually reduced in said axial direction.

23. A pneumatic tire as set forth in claim 16, in which said sipes vary in depth in such a manner that the quantity of siping is gradually reduced in said axial direction.

24. A pneumatic tire as set forth in claim 20, in which said sipes varies in depth in such a manner that the quantity of siping is gradually reduced in said axial direction.

25. A pneumatic tire as set forth in claim 16, in which the circumferential spacing of said sipes varies in such a manner that the quantity of siping is gradually reduced in said axial direction.

26. A pneumatic tire as set forth in claim 20, in which the circumferential spacing of said sipes varies in such a manner that the quantity of siping varies is gradually reduced in said axial direction.

* * * * *